United States Patent [19]

Boettcher

[11] 4,369,896

[45] Jan. 25, 1983

[54] HELICAL VENDING MACHINE WITH PIVOT PANEL ADJUSTMENT

[75] Inventor: William C. Boettcher, Foley, Mo.

[73] Assignee: D.O.V.E. Equipment Corporation, Winfield, Mo.

[21] Appl. No.: 248,559

[22] Filed: Mar. 27, 1981

Related U.S. Application Data

[63] Continuation-in-part of Ser. No. 35,421, May 2, 1979, Pat. No. 4,258,860, and a continuation-in-part of Ser. No. 139,991, Apr. 14, 1980, Pat. No. 4,312,460.

[51] Int. Cl.3 .............................................. C07F 11/36

[52] U.S. Cl. ...................................... 221/75; 221/242

[58] Field of Search ............... 198/657, 659, 661, 670; 221/69, 241, 75, 242

[56] References Cited

U.S. PATENT DOCUMENTS

| | | | |
|---|---|---|---|
| 3,601,281 | 8/1971 | Schlaf | 221/75 |
| 3,861,561 | 1/1975 | Wittern et al. | 221/75 |
| 3,935,966 | 2/1976 | Pitel et al. | 221/75 |
| 4,148,412 | 4/1979 | Lotspeich | 221/75 |
| 4,149,653 | 4/1979 | Lennartson | 221/75 |
| 4,240,563 | 12/1980 | Lennartson | 221/75 |

*Primary Examiner*—Joseph J. Rolla
*Assistant Examiner*—Jan Koniarek
*Attorney, Agent, or Firm*—Gravely, Lieder & Woodruff

[57] ABSTRACT

This invention involves a vending machine having helix discharge units which are used to store and dispense packaged objects such as chip products, candy, mints, chewing gum, candy bars, cigarettes, cigars, etc. The unit preferably utilizes a rotatable helix dispensing spindle having a pivotally adjustable panel within the convolutions of the helix which can be moved from horizontal to vertical to change the size of the compartment to accommodate different size packages. The size of the compartment is determined by the position of the panel with the compartment being largest when the panel is vertical and smallest when it is horizontal.

10 Claims, 5 Drawing Figures

HELICAL VENDING MACHINE WITH PIVOT PANEL ADJUSTMENT

REFERENCE TO PRIOR APPLICATIONS

This application contains subject matter in common with my co-pending applications Ser. No. 35,421, filed May 2, 1979, now U.S. Pat. No. 4,258,860 and Ser. No. 139,991, filed Apr. 14, 1980 now U.S. Pat. No. 4,312,460.

BACKGROUND OF THE INVENTION

This invention relates generally to vending machines, and more particularly to those which utilize a helical coil to advance items from a storage position within the machine to a chute for discharge to the consumer. U.S. Pat. Nos. 3,178,055, 3,335,907, and 3,601,281 disclose various vending machines of this type. The machines usualy have a discharge chute mounted on the front or at the side and are designed to hold a plurality of individual item discharge units. The units are advanced by rotation of the coil by means of a motor activated by the customer after money is deposited in the machine.

One problem in these vendors, which is addressed in Ser. No. 35,421, is that of providing different sized compartments in the units to accommodate different sized packages.

Economy of manufacture dictates that the individual units, and hence the trays, be of identical construction. The consumer, however, demands that a wide range of products be made available to him through vending machines. The size and shape of the packaging for these various products varies from the typical sack for potato chips and the like, to packages of various sizes of cigarettes, and to still other packages for thin or little cigars, mints, lifesavers, gum and other products.

The problem for a manufacturer, therefore, is to provide a standard-sized tray, based quite often on a size necessary for vending cigarette packages, which is readily convertible to handling the smaller mint, gum, or candy bar packages.

While there are various methods for changing the size of the compartments, these earlier devices all result in compartments of fixed size, so that if the operator of the machine wished to change the size on site he needs to disassemble part or all of the unit and possibly has to take the unit back to his base of operations. It is quite desirable that a method be provided for adjusting the size of the units at the site, so that popular items can be included in a particular machine even if they happen to differ in size from the items currently vended from the machine.

Among the patents which have attempted to utilize a spacer of some sort to reduce the size of the compartments are Whistin, U.S. Pat. No. 3,908,858, and Wittern, U.S. Pat. No. 3,929,255. However, neither of these units is completely adjustable on site and does not achieve all of the objects and advantages of the present invention.

Accordingly, it is a principal object of the present invention to provide a helical vending unit having an adjustable panel positioned within the helix to change the size of the merchandise compartment encompassed by the helix and a tray in which the helix runs.

These and other objects and advantages will become apparent hereinafter.

SUMMARY OF THE INVENTION

The present invention comprises a vending machine unit in which a helix turns in a tray to progress items toward the open end of the tray and a panel mounted within the helix and movable between vertical and horizontal to change the size of the merchandise compartment defined between the panel and a side wall of the tray in which the helix is positioned.

In the drawings wherein like numbers refer to like parts wherever they occur:

Figure 1:
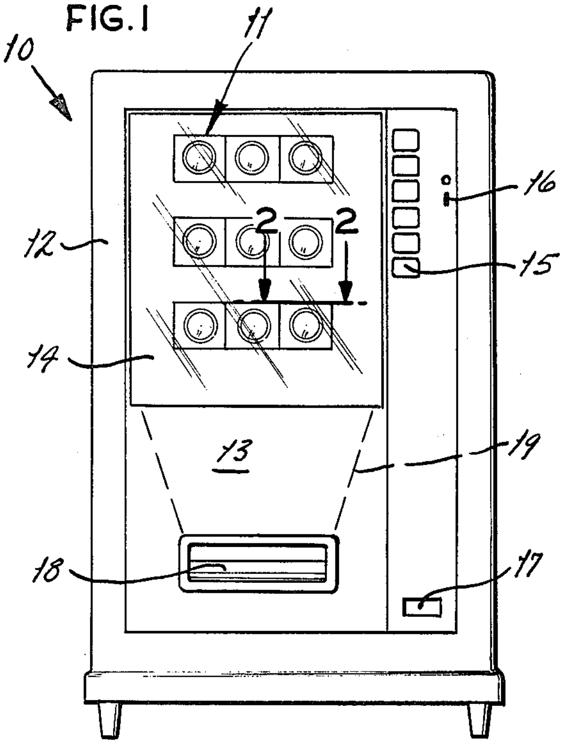
FIG. 1 is a front elevational view showing a vending machine having individual units incorporated therein.

The present invention is embodied in a vending machine 10 (FIG. 1) having a plurality of helix discharge units indicated generally by the numeral 11 which preferably are disposed in side-by-side horizontal and/or vertical relationship within the storage compartment portion of the machine 10. If desired, the units 11 can be used individually, but the more usual arrangement is a bank within a cabinet 12 as shown. The cabinet or storage compartment 12 includes a front door 13 having a clear see-through window portion 14 through which the customer may view the merchandise residing in the units 11. Mounted on the machine 10 are selection means 15 which activate the individual units 11, a coin slot 16 and a coin return 17. A discharge opening 18 positioned at the lower portion of the door 13 is connected to a discharge chute 19 which connects with the open front end of the vend units 11.

Figure 2:
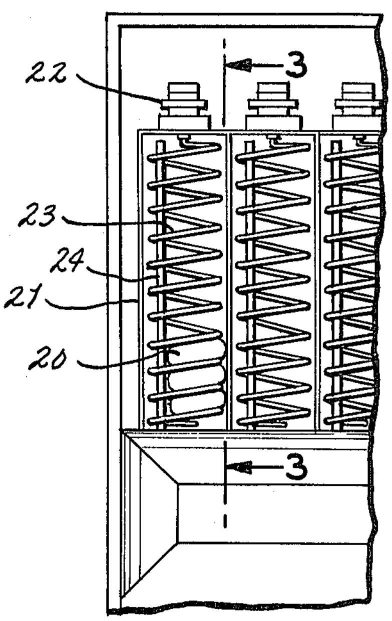
FIG. 2 is a sectional view taken along line 2—2 of FIG. 1 showing several of the individual vend units in plan.

A plurality of packaged items 20 are positioned within each helix discharge unit 11 (FIG. 2). The discharge units 11 are designed so that they can be moved forward of the cabinet 12 for refilling. Each of the units 11 is similar and preferably comprises a tray assembly 21, a drive unit 22, a helix 23, and an adjustable panel mechanism 24.

In the form of the invention shown in FIGS. 1-5, the helix 23 is known as a rear driven helix which means that there is no positive connection between the drive means 22 and the leading edge 25 of the helix 23, and the only power applied to the helix 23 is at its connection to the drive means 22.

The tray assembly 21 comprises a bottom wall 30, which preferably has a layer of teflon or the like positioned along the upper side of the bottom wall 30 so that the helix 23 rotates thereon. This protects the surface of the bottom wall 30, which may be painted, and also acts as a friction and power consumption reducing element for the helix 23.

The tray assembly unit 21 further comprises side walls 32 and a rear wall 33. The drive unit 22 is attached to the back side of the rear wall 33 and has a drive shaft 34 in which a drive rod 35 is positioned and caused to rotate therewith by means of flattened surfaces. The drive rod is an extension of the rearward end of the helix 23. Thus, when the drive unit 22 is energized, the drive shaft 34 rotates the drive rod 35 and consequently the helix 23 is rotated to propel the packages 20 stored within the convolutions of the helix 23 toward the open end 38 of the tray assembly 21. The outermost package 20 is propelled out of the tray assembly 21 into the discharge chute 19. The unit is set up so that a package is discharged with each 360° rotation of the helix 23.

The adjustment means 24 is embodied in a panel 50 which is pivotable around a support rod 51. The rod 51 is fixedly mounted in a bracket 52 positioned beneath the tray bottom wall 30. The support rod 51 has a U-shape on its forward end and extends rearwardly through the helix 23. The panel 50 is pivotally mounted on this portion of the support rod 51 and also is within the helix 23.

Figure 5:
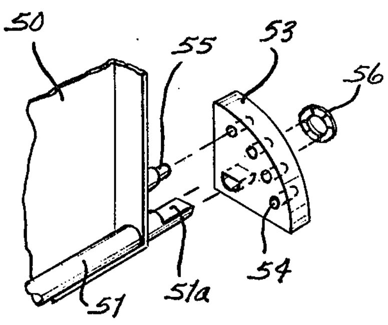
FIG. 5 is an enlarged exploded fragmentary view showing the connection at the rear end of the adjustable panel.

Fixed on the rearward or free end of the rod 51 is a pin locator 53 (FIG. 5). The pin locator 53 has openings 54 along its outer periphery which are constructed and arranged to engage a locator pin 55 fixed to the rearmost panel 50. As the panel 50 is pivoted on the rod 51, the locator pin 55 is engaged with an opening 54 to fix the panel in predetermined position.

The pin locator 53 is fixed to a flattened portion 51*a* on the end of the support rod 51. A correspondingly shaped opening is formed in the pin locator 53 and a pushnut 56 engages the rod end to hold the locator 53 to the rod and 51*a*.

A spring retainer 57 is fixed on the rod at the forward end thereof and traps resilient means, such as a spring 58, between it and the forward edge of the panel 50. The spring 58 urges the panel 50 rearwardly into engagement with the locator holes 54, and is compressed when the tray 50 is moved forward to disengage the locator pin 55 from the opening 54 so that the panel 50 can be rotated to a new position where the pin 55 and opening 56 are engaged.

Figure 3:
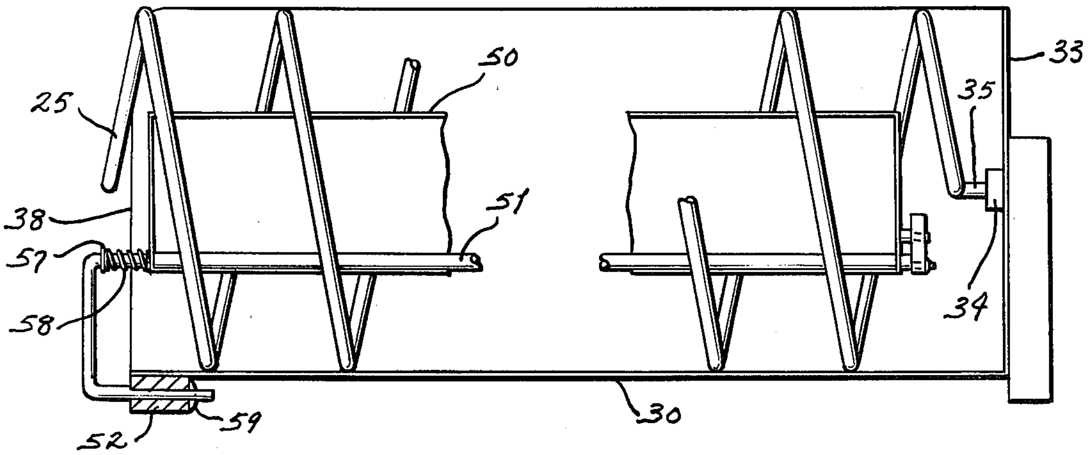
FIG. 3 is a vertical sectional view taken along line 3—3 of FIG. 2.
Figure 4:
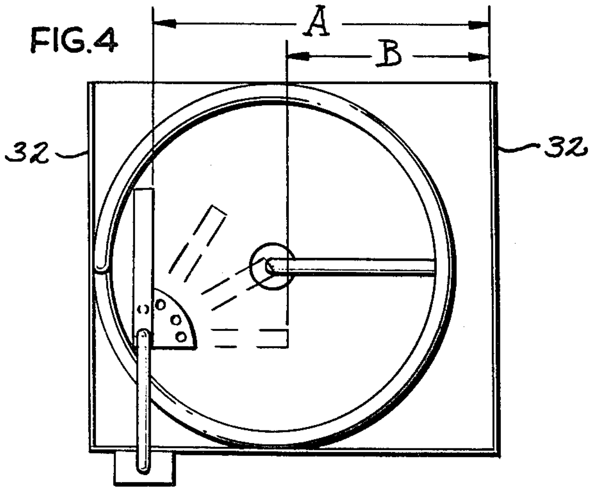
FIG. 4 is an end elevational view of a single dispensing module shown in FIG. 3.

The end of the rod 51 which is engaged with the bracket 52 also is flattened and the rod 51 is held to the bracket by means of a pushnut 59 (FIG. 3).

The panel 50 and bracket 52 are positioned toward one side of the tray 21 and when the panel 50 is upright or in a vertical position (FIG. 4), the compartment A is largest. When the panel 50 is horizontal (broken lines in FIG. 4), the compartment B is at its smallest. Thus, the panel 50 can be adjusted incrementally between vertical and horizontal to vary the size of the compartment between largest and smallest.

What is claimed is:

1. A vending machine item discharge unit comprising:

(a) a tray means having a sidewall, a second sidewall, rear and bottom walls, (b) helical means having a plurality of convolutions along its length to retain articles to be dispensed in the convolutions, (c) drive means connected to the helical means to rotate said helical means in predetermined increments upon activation by a customer, and (d) adjustable panel means positioned within the helical means toward one side thereof and movable between vertical and horizontal to vary the size of the article compartment defined between the panel and the second side wall of said tray.

2. The unit of claim 1 wherein the helical means is connected to the drive means at the rear end of the helix.

3. The unit of claim 1 wherein the panel is pivoted on a fixed support rod mounted unit.

4. The unit of claim 3 including panel locator means fixedly mounted on the rear end of the support rod and a locator pin positioned on the panel and engageable with the locator means to fix the panel in predetermined positions between vertical and horizontal.

5. The unit of claim 4 including resilient means urging the locator pin into engagement with the locator means.

6. The unit of claim 5 wherein the resilient means is interposed between the forward end of the panel and a stop means on the support rod.

7. The unit of claim 3 wherein the support rod is a U-shaped member having a leg anchored to the tray and a leg positioned in the helix pivotally supporting the panel so that the panel can be moved between fixed positions with respect to the tray.

8. The unit of claim 7 including an anchor bracket mounted on the leg of the support rod on which the panel is mounted, said anchor having openings located around the periphery thereof, the panel having a stud on the rearward edge aligned with the openings in the anchor so that the position of the panel is fixed with respect to the tray walls when the stud is engaged in said openings.

9. The unit of claim 8 including resilient means urging the panel toward the anchor.

10. The unit of claim 9 wherein the resilient means surrounds the panel support leg of the support rod and is interposed between a stop thereon and the leading edge of the panel.

* * * * *